Oct. 8, 1963    J. P. VUKASIN ETAL    3,106,149
AUTOMATIC BEVERAGE BREWING MACHINE
Filed Aug. 15, 1960    3 Sheets-Sheet 1

INVENTORS
John P. Vukasin
BY Lloyd R. Bowen

Attorney

INVENTORS
John P. Vukasin
BY Lloyd R. Bowen
Their Attorney

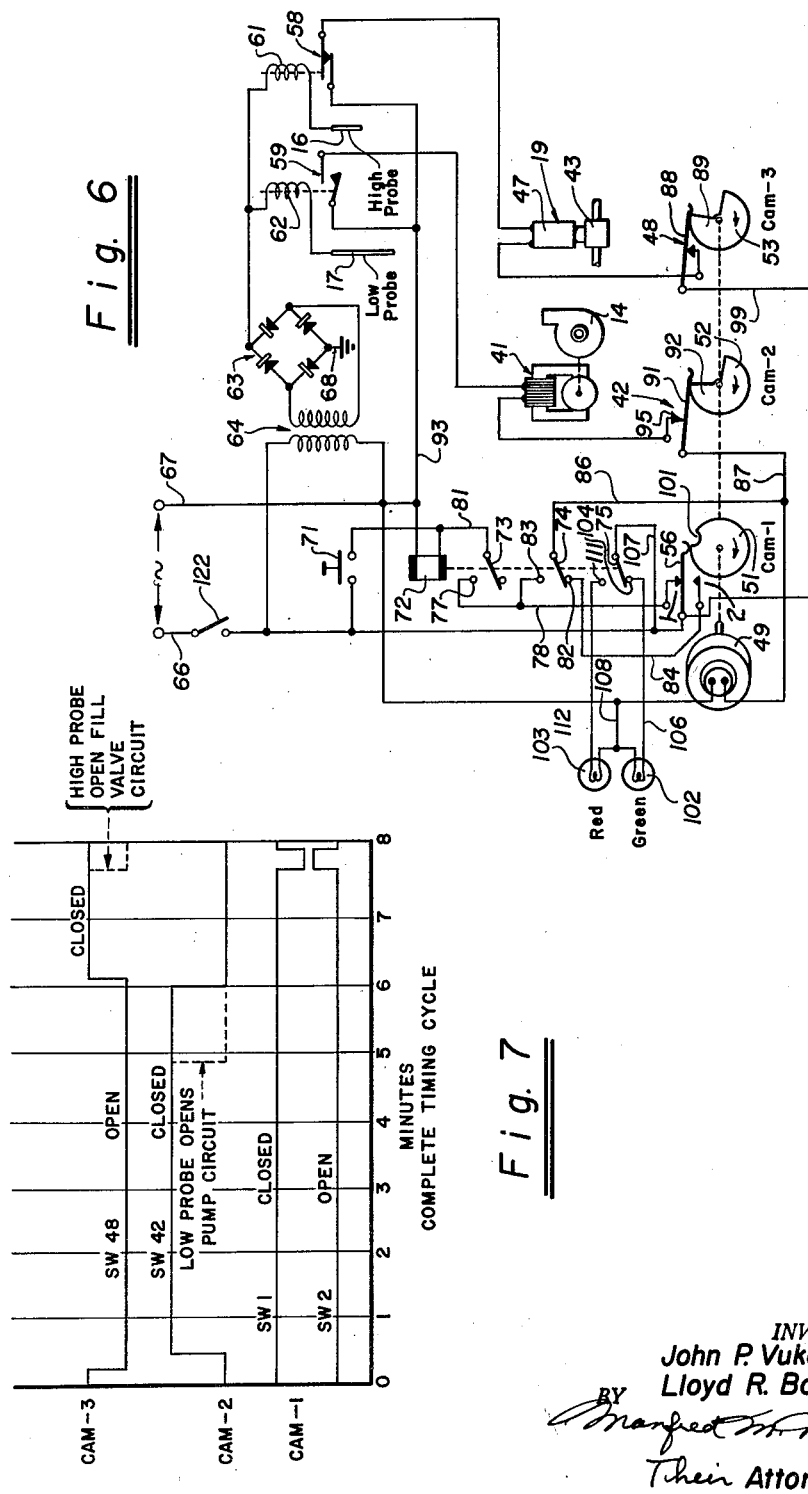

United States Patent Office 3,106,149
Patented Oct. 8, 1963

3,106,149
AUTOMATIC BEVERAGE BREWING MACHINE
John P. Vukasin and Lloyd R. Bowen, Oakland, Calif.;
said Bowen assignor to said Vukasin
Filed Aug. 15, 1960, Ser. No. 49,791
4 Claims. (Cl. 99—283)

The invention relates to devices and apparatus for making hot beverages such as coffee brewing machines.

An object of the present invention is to provide means, here an assemblage of interrelated parts, for converting one style of pre-existing and time proven brewing apparatus of the manual operating type to automatic operation.

Another object of the present invention is to provide a beverage brewing machine of the character described having a very precise brewing cycle affording sure, foolproof and automatic production of beverage of constant and dependable high quality.

A further object of the present invention is to provide an automatic brewing machine of the character described which is composed of sturdy and durable parts which can be expected to give the apparatus a long, trouble-free and useful life.

The invention possesses other objects and features of advantage, some of which of the foregoing will be set forth in the following description of the preferred form of the invention which is illustrated in the drawings accompanying and forming part of this specification. It is to be understood however, that variations in the showing made by the said drawings and description may be adopted within the scope of the invention as set forth in the claims.

Referring to said drawings (three sheets):

FIGURE 6 is a schematic wiring diagram of the electrical circuitry used in the present machine.

FIGURE 7 is a chart of operation of the several parts during the complete cycle of operation.

Figure 2:
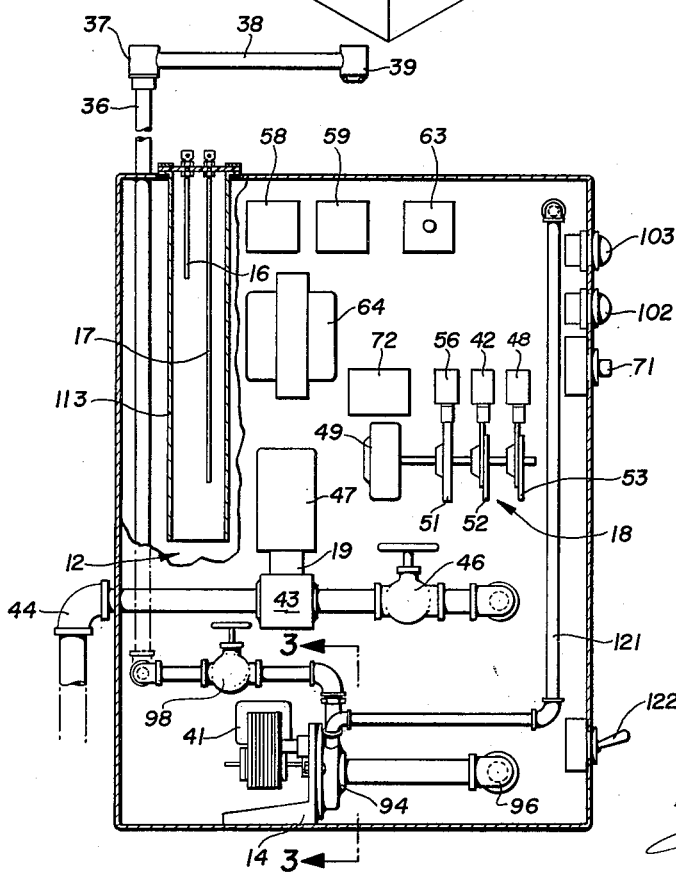
FIGURE 2 is a transverse sectional view taken substantially on the plane of line 2—2 of FIGURE 1 and with a portion further broken away to show internal construction.

With reference to the accompanying drawing the automatic brewing machine of the present invention consists briefly of a beverage chamber 11, a hot water reservoir 12, a holder 13 for beverage concentrate such as ground coffee or tea, chocolate or the like, and sometimes referred to in the art as a basket, adapted for mounting at the top of and in registration with the beverage chamber 11, a pump 14, see FIGURE 2, connected to withdraw water from the reservoir and discharge over the holder 13 for brewing and gravitation into the chamber 11, electrodes 16 and 17 mounted in the reservoir for sensing high and low water levels, and timing means 18 co-functioning with the electrodes 16 and 17 and pump 14 for discharging a measured quantity of water onto the holder 13 during a pre-determined brewing period. Additionally there is preferably provided in the present apparatus reservoir refilling means 19 which is appropriately interconnected with the timing means, electrode and pump for sequentially refilling the reservoir during a predetermined operating cycle.

Figure 1:
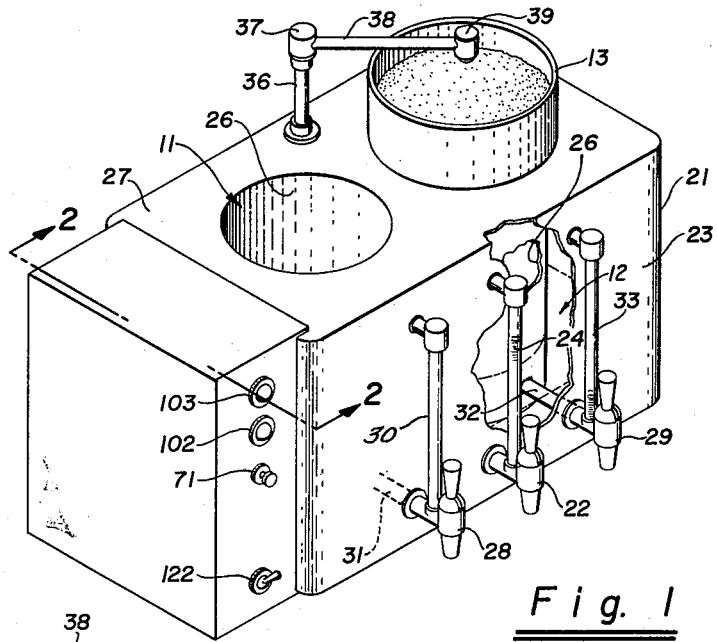
FIGURE 1 is a perspective view, with portions broken away to show internal construction, of a brewing machine constructed in accordance with the present invention.

The machine here includes an outer housing 21 which provides a water container or reservoir 12 and is equipped with a gas or electric heater, not shown, which are well known in the art and which may be manually or thermostatically controlled for heating the water in the reservoir 12 to appropriate brewing temperature, preferably, in the case of coffee, between 200° F. and 212° F. A spigot 22 is mounted on the front wall 23 of the housing and is connected to reservoir 12 for manual withdrawing of hot water as may be required for the manual making of tea and other beverages. A liquid level sight tube 24 is commonly provided on the connection to spigot 22 for indicating the water level within reservoir 12. One or more beverage chambers 11 may be provided, two being commonly used as here shown. Each chamber 11 is normally provided by an open top container having a continuous side and bottom wall 26 which is joined and sealed at its upper edge to the top wall 27 of the outer housing 21. Spigots 28 and 29 are mounted on the front wall 23 of the housing 21 and are connected by pipes 31 and 32 extending through the water bath 12 to the walls 26 of the two beverage chambers here provided, for the manual withdrawal of hot beverage from the chambers. Liquid level sight tubes 30 and 33 are mounted on the pipe connections to the spigots 28 and 29 so as to show the beverage level in the two chambers. The holder or basket 13 is interchangeably mounted on the top wall 27 over and in registration with the two chambers and is so positioned during the brewing cycle. Upon completion of the brewing cycle the basket 13 is removed with its spent grounds and a conventional cover, not shown, is placed over the otherwise open top of the beverage chamber. Water service to the two beverage chambers is here provided by a pipe 36 at the rear center of the top wall 27 and which is connected at its upper end to a swivel 37 from which is extended a horizontal pipe 38 terminating in a water spray head 39. As will be observed from FIGURE 1, the head 39 may be swung from swivel 37 to a position overlying either of the beverage chambers 11.

Referring next to the drive and control portions of the apparatus, the pump 14 is driven by an electric motor 41 which is connected in an energizing circuit including a switch 42. The reservoir refilling means 19 here consists of a solenoid actuated valve 43 which is connected in the water supply line to the reservoir, a manual control valve 46 here being additionally provided, see FIGURE 2, for the regulation of flow of supply water during the reservoir refilling portion of the operating cycle. The solenoid winding 47 is connected in an electric energizing circuit including a switch 48. The timing means 18 here includes a clock-type synchronous electric motor 49 and a plurality of time-cycling cams 51, 52 and 53 driven thereby with cams 52 and 53 connected for opening and closing switches 42 and 48 so as to control the operation of pump 14 and the solenoid valve 19. Cam 51 is mounted to engage the arm 56 of a double throw switch having selectably engageable contacts 1 and 2 and which are used to control the operation of the timing motor 49 and other parts of the apparatus. Cams 51, 52 and 53 are for convenience also labelled cam 1, cam 2 and cam 3 in FIGURES 6 and 7 and the double switch 56 is further denoted as sw1 and sw2 in FIGURE 7 corresponding with the engagement of switch contacts 1 and 2 by switch arm 56.

The interconnection of the water-sensing electrodes 16 and 17 is here effected by relay switches 58 and 59 connected in series with the solenoid winding 47 and the pump motor 41 respectively and being actuated by relay coils 61 and 62 which are connected to the high and low probes 16 and 17, respectively. Preferably, the coils 61 and 62 are energized by reduced D.C. voltage here obtained from a full wave rectifier 63 connected to a stepdown transformer 64 having its primary winding connected to the normal A.C. supply lines 66 and 67. The probe circuits function by a return ground connection 68 which is established by the electrodes 16 and 17 when in contact with the water in reservoir 12. Switch 58 is normally closed and is opened upon energizing of of relay coil 61 and switch 59 is normally open and is closed upon energizing of relay coil 62.

Initiation of the brewing cycle is effected by manually closing a starting switch 71 which has one terminal connected as seen in FIGURE 6 to supply lead 66 and its other terminal to the coil 72 of a relay switch having three switch arms 73, 74 and 75, the other side of coil 72 being connected to supply lead 67 whereby the closing of switch 71 will energize coil 72. Preferably, the circuitry is arranged for the self-locking-in of relay 72 so that only a momentary closure of switch 71 is required to initiate operation. For this reason a simple push-button switch is desired. The several cams 51–53 are illustrated in starting position and in this position switch arm 56 is engaged by cam 51 and positioned thereby in engagement with contact 1 thereby closing switch $sw1$. Switch arm 56 is constantly energized by its connection to supply lead 66. Relay switch arm 73 has a normal open position as illustrated in FIGURE 7 but is displaced on energizing of coil 72 to a closed position with switch contact 77 here connected by conductor 78 to contact 1 of switch 56. Switch arm 73 is connected by conductor 81 to the side of coil 72 connected to switch 71, thereby establishing a parallel flow of current upon energizing of coil 72 so as to hold coil 72 energized so long as swtiches 73 and $sw1$ are closed, thus placing the ensuing operation of the relay 72 under the effective control of $sw1$.

Relay switch 74 is used as a double throw switch having a normal or rest position in engagement with contact 82 and in energized position (upon energization of coil 72) in engagement with contact 83. Contact 82 is connected by conductor 84 to the normally open switch $sw2$. Contact 83 is connected to conductor 78 which is energized through closed switch $sw1$ as aforesaid so that upon energizing of the relay 72, current is sent through conductor 86 connected to switch arm 74 for servicing the timer motor 49 and the pump motor 41, the latter being connected to a bus 87 energized by conductor 86. Timer motor 49 is connected as illustrated directly between bus 87 and supply line 67 so that the timer motor 49 starts at once upon energizing of the relay 72.

Following the sequential operation of the parts, it will be noted that arm 88 of switch 48 is engaged by cam 53 in the starting position of the parts in such a manner as to provide a closed position of switch 48. With reference to FIGURE 6, it will be seen that the lobe 89 of cam 53 is about to engage the outer offset end of arm 88 in the starting position of the cam, and the parts are proportioned so that in the ensuing rotation of the cam, clockwise as viewed in FIGURE 6, the offset end of arm 88 is displaced by cam lobe 89 to move arm 88 to an open position of switch 48 thus opening the electrical circuit to the solenoid valve 19 (fed by conductor 99) and preventing its operation and the refilling of the reservoir during the period of time that the pump 14 is placed in operation. This early opening of switch 48 is depicted by the chart line marked $sw48$ opposite cam 3 in FIGURE 7.

The cam operated switch arm 91 of the pump motor switch 42 is set to close after switch 48 opens as above explained. With reference to FIGURE 6, it will be seen that the outer offset end of switch arm 91 is positioned in the hollow or dwell portion of cam 52 and is engaged by cam lobe 92 as the cam rotates (in a clockwise direction as seen in FIGURE 7) and has sufficient offset to thereby displace switch arm 91 into engagement with the other contact 95 of switch 42, thereby closing the switch. The closed and open positions of switch 42 are depicted by the chart line labelled $sw42$ opposite cam 2 in FIGURE 7. Closing of switch 42 sends current through pump motor 41 and normally open relay switch 59 which is connected by return bus 93 to supply lead 67 thereby energizing pump 14 for withdrawing water from the reservoir for passage over the ground coffee. The suction inlet or eye 94 of pump 14, see FIGURE 2, is here connected by pipe 96 to the water reservoir 12. The discharge passage 97 of the pump is here connected to a manually controlled valve 98 which is in turn connected to pipe 36 for delivery of hot water to sprayhead 39 positioned over the ground coffee. Valve 98 permits the setting of the rate of flow for a desired brewing period. For example, for a conventional 3-gallon coffee beverage product the inflow of water over the coffee grounds is desirably set to last for a period of 4½ to 5 minutes. The coffee beverage will then drain completely from the grounds by the end of the present operating cycle of approximately 8 minutes.

In accordance with the foregoing the measured three gallons of water will be slowly withdrawn from the reservoir at a constant rate over a period of 4½ to 5 minutes at which time the water level in the reservoir will be dropped to the lower end of probe 17 which is set to sense the lower water level in the reservoir. As the water level recedes from the lower end of probe 17 the electrical circuit established by the contact of the probe and the water is broken, thus de-energizing relay coil 62 and causing switch 59 to assume its normal open position thus cutting off the operation of the pump. The opening of the pump circuit by the low probe is graphically illustrated by the dashed line appearing on chart line $sw42$ in FIGURE 7 at between 4½ and 5 minutes. Upon completion of delivery of the hot water from sprayhead 39, the coffee brewing cycle continues for the balance of the 8 minutes operating cycle. At approximately 6 minutes the lobe 92 on cam 52 will pass the end of switch arm 91, permitting the latter to drop into the recess or dwell portion of the cam, thus opening switch 42 and as will be noted, this open portion of the cam extends for slightly more than 90° of its periphery so that switch 42 will remain open during the balance of the operating cycle and until shortly after the start of the next brewing cycle.

Very shortly after the opening of the switch 42 by cam 52, cam 53 which rotates synchronously with cam 52, positons its open section opposite the end of switch arm 88 causing the closing of switch 48 and the energizing of solenoid 19 through the normally closed relay switch 58 thus admitting fresh water through supply line 44 and valve 46 to the reservoir. Valve 46 is set to cause the refilling of the reservoir in about 1½ minutes at which time the water level in the reservoir comes up to the high probe 16 and establishes electrical contact therewith, thus energizing relay coil 61 and opening switch 58 and causing the solenoid valve to move to its normal, de-energized, closed position. It will be noted from FIGURE 7 that the open section of cam 53 is approximately 90° so that the solenoid switch 48 will close shortly after the 6 minute point in the operating cycle and remain closed throughout the balance of the operating cycle and until shortly after the start of the next operating cycle. During this period the operation of the solenoid 19 is then under the control of the high level probe 16 as suggested by the dashed lines in chart line $sw48$ in FIGURE 7. Accordingly, should the attendant withdraw hot water as from spigot 42, solenoid valve 19 will be opened to admit an equal amount of fresh water. With reference to FIGURE 6 it will be noted that the electrical supply lead 99 for switch 48 is taken directly from supply lead 66 so that switch arm 88 is constantly energized.

With reference to FIGURE 7 it will be noted from chart line marked $sw1$ that switch 1 remains closed from the start of the operating cycle to near the end of the cycle when a notch or open portion 101 in cam 51 moves into registration with the outer end of switch arm 56 thus permitting the switch arm to drop away from contact 1 and into engagement with contact 2. When his occurs, current ceases to flow in conductor 78 which de-energizes relay 72 and returns switch arms 73, 74 and 75 to their normal de-energized position. The notch 101 in cam 51 thus functions to drop out the relay. However, the timer motor 49 is continued momentarily in operation by the flow of current from switch contact 2 through conductor 84, switch contact 82, switch arm 74 and conductors 86 and 87. As cam 51 continues to rotate, however, switch arm 56 is displaced out of notch 101 at the end of the operating cycle thus breaking the connection to switch contact 2 and opening the circuit to the timer motor. With reference to FIGURE 7 it will be seen from chart line marked sw2 that switch 2 is normally open and is closed only very briefly at the end of the operating cycle; while switch 1 is normally closed and is opened only very briefly near the end of the operating cycle contemporaneously with the closing of switch 2.

Relay switch 75 is used for energizing a pair of indicator lights 102 and 103. As will be seen in FIGURE 6, switch arm 75 has a normal relay de-energized position in engagement with contact 104 and the latter is connected by conductor 106 to an "on" or "green" light 102. The electric circuit is completed by conductor 107 which connects switch arm 75 to supply line 66 and by conductor 108 which connects light 102 to the other supply lead 67. Upon initiation of the brewing cycle by energizing of relay 72, switch arm 75 moves into engagement with contact 111 which is connected by conductor 112 to light 103, the latter being connected to conductor 108 to complete the electrical circuit. Light 102 is preferably a white or green light to indicate that the apparatus is ready to brew coffee upon the pushing of switch 71. This "ready" light goes out when switch 71 is pushed and light 103 comes on and stays on during the brewing cycle. The latter light is preferably red so as to caution the operator that the machine is in its brewing cycle.

A résumé of operations follows. Pushing of switch 71 initiates operation by energizing relay 72 and starting the timer motor 49 thus starting the rotation of cams 51, 52 and 53 jointly driven thereby. Solenoid 72 locks in through switch 73 and stays locked in until switch 1 opens near the end of the operating cycle. Very shortly after the start of operations, cam 53 opens the circuit to solenoid valve 19 so as to prevent the inflow of water into the reservoir until after the measured quantity of water has been withdrawn by the pump. With reference to the chart line sw48 in FIGURE 7 it will be noted that there is a sharp drop of this line shortly after initiation of operations indicating the opening of the switch and then an abrupt raising of the line some 6 minutes later upon closing of the switch by cam 53. As suggested by chart line sw42 in FIGURE 7, cam 52 closes the pump switch 42 directly after the solenoid valve switch 48 is open and water is then pumped from the reservoir to the sprayhead 39 for about the next 5 minutes until the low probe 17 in the reservoir opens the circuit to the pump motor 41. At about 6 minutes the cam 52 rotates to open switch 42 thus preventing further operation of the pump during the balance of the operating cycle. The probes 16 and 17 may be surrounded by a housing or tube 113 so as to position the probes in quiet water and preventing their operation by wave action which may occur within a larger body of water in the reservoir. Shortly after the opening of switch 42 by cam 52, the solenoid valve switch 48 is closed to refill the reservoir with fresh water from supply line 44, it being noted that this action is deferred until after the positive opening of pump switch 42 whereby the pump is then not under the action of the low probe 17. Switches 1 and 2 cooperate at the end of the operating cycle to de-energize relay 72 and return all parts to starting position. A white or green ready light 102 is in normal operation and automatically comes on at the end of the brewing cycle. A "red" warning light 103 comes on at the start of the brewing cycle and stays on during the cycle. These two lights 102 and 103 are under the control of relay switch 75.

Figure 5:
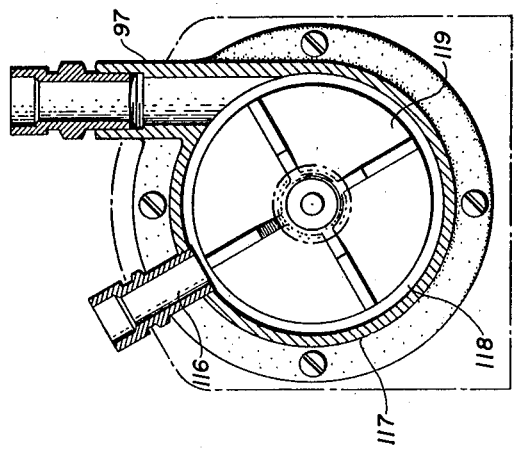
FIGURE 5 is a cross sectional view of the pump taken substantially on the plane of line 5—5 of FIGURE 4.
Figure 4:
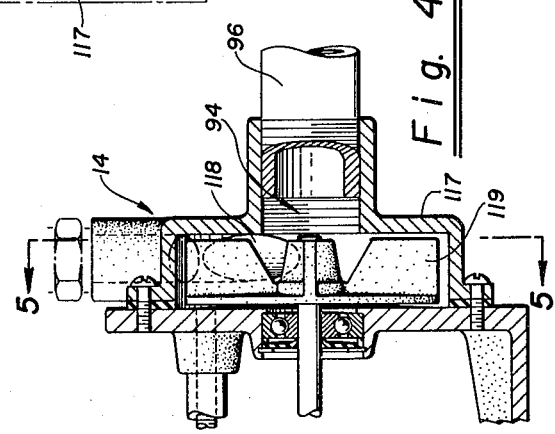
FIGURE 4 is a cross sectional view of the pump taken substantially on the plane of line 4—4 of FIGURE 3.
Figure 3:
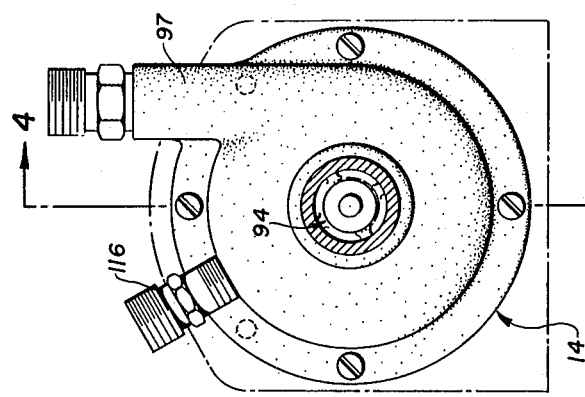
FIGURE 3 is a cross sectional view of the centrifugal pump forming part of the present apparatus and is taken substantially on the line of plane 3—3 of FIGURE 2.

One of the major problems encountered in the production of and apparatus of the present character is the extraordinary difficulty of pumping water at an elevated temperature by a simple centrifugal pump. At about 200° to 210° F., the desired temperature for brewing of coffee, fresh water creates bubbles in the pump producing cavitation of vapor lock which renders the pump inoperable. This problem is aggravated by the use of fresh water which has a certain amount of adsorbed or entrained air in the water. After a great deal of experimentation it was found that this cavitation of the pump could be effectively prevented by providing a second discharge passage 116 in the pump housing 117. As will be seen from FIGURES 3, 4 and 5, the pump housing 117 is formed with an impeller chamber 118 in which is mounted a rotary vane impeller 119. Housing 117 is formed with a water suction inlet 94 centrally of the impeller chamber and with the two discharge outlets 97 and 116 peripherally of the chamber 118. Discharge opening 116 is here connected by pipe 121 for a relatively open fluid flow passage back to the reservoir 12, while discharge passage 97 has a relatively restricted fluid flow through valve 98 to the sprayhead 39. In this manner a relatively full flow condition in the pump is obtained which effectively prevents the disabling cavitation above referred to.

As above noted the burners or heaters customarily used with apparatus of this type are thremostatically controlled to maintain the water at proper brewing temperature of between 200° and 212° F. and are capable of bringing the water in the reservoir up to this temperature within a matter of a few minutes after the end of the brewing cycle when a supply of fresh water has been received in the reservoir. A temperature gauge (not shown) is customarily used to advise the attendant when the water temperature is elevated to desired brewing temperature. A master switch 122 is preferably inserted in line 66 ahead of the manual starting switch 71.

We claim:

1. An automatic beverage brewing machine comprising, a housing providing an adjacent thermally connected beverage chamber and hot water reservoir, a holder for beverage concentrate adapted for mounting at the top of said beverage chamber, an electric motor driven water pump and energizing circuit therefor including a relay switch and a series connected timer switch, said pump being connected to said reservoir for delivering water to said holder, high and low electrodes mounted in said reservoir and having lower ends positioned at pre-determined high and low water levels respectively defining a pre-determined quantity of water to be delivered to said holder, an electric circuit for said low probe including a relay coil connected for closing said relay switch when the water level in said reservoir is above the lower end of said low probe, said relay switch being biased to open position when said water level is below the lower end of said low probe, an electric motor driven time cycling cam connected for closing said timer switch for a pre-determined time period to operate said pump and to make the continued operation of said pump dependent upon said low electrode, and means operated by said timer motor and co-functioning with said high electrode for refilling said reservoir sequentially to said pump operation.

2. An automatic beverage brewing machine comprising, a housing providing an adjacent thermally connected beverage chamber and hot water reservoir, a holder for beverage concentrate adapted for mounting at the top of said beverage chamber; an electric motor driven water pump and energizing circuit therefor including first and second series connected switches; said pump being connected to said reservoir for delivering water to said holder; water inlet means for said reservoir including a solenoid operated valve and an electric circuit including a 3rd and 4th series connected switches. high and low electrodes mounted in said reservoir and having lower ends positioned at pre-determined high and low water levels respectively defining a pre-determined quantity of water to be delivered to said holder; an electric circuit for said low probe including a first relay coil connected for closing said first switch when the water level in said reservoir is above the lower end of said low probe, said first switch being biased to open positions when said water level is below the lower end of said low probe; an electric circuit for said high probe including a second relay coil connected for opening said 3rd switch when the water level in said reservoir is above the lower end of said high probe, said 3rd switch being biased to open position when said water level is below the lower end of said high probe; and a pair of electric motor driven time cycling cams connected for opening and closing said second and fourth switches and co-functioning with said electrodes for delivering said measured quantity of water to said holder and sequentially refilling said reservoir to said high water level during a pre-determined operating cycle.

3. An automatic beverage brewing machine comprising, a housing providing an adjacent thermally connected beverage chamber and hot water reservoir, a holder for beverage concentrate adapted for mounting at the top of said beverage chamber; an electric motor driven water pump and energizing circuit therefor including first and second series connected switches; said pump being connected to said reservoir for delivering water to said holder; water inlet means for said reservoir including a solenoid operated valve and an electric circuit including 3rd and 4th series connected switches; high and low electrodes mounted in said reservoir and having lower ends positioned at pre-determined high and low water levels respectively defining a pre-determined quantity of water to be delivered to said holder; an electric circuit for said low probe including a first relay coil connected for closing said first switch when the water level in said reservoir is above the lower end of said low probe, said first switch being biased to open position when said water level is below the lower end of said low probe; an electric circuit for said high probe including a second relay coil connected for opening said 3rd switch when the water level in said reservoir is above the lower end of said high probe, said 3rd switch being biased to open position when said water level is below the lower end of said high probe; a timer motor and a pair of cycling cams driven thereby and being connected for opening and closing said second and fourth switches and co-functioning with said electrodes for delivering said measured quantity of water to said holder and sequentially refilling said reservoir to said high water level during a pre-determined operating cycle; a third electric circuit for said timer motor and including a relay operated switch and a manually controlled starting switch connected to energize said third circuit, said relay switch being connected to control the flow of current to said first-named circuits; and a third cam driven by said timer motor and a switch operated by said third cam and connected for de-energizing said third circuit at the end of the operating cycle.

4. An automatic beverage brewing machine as characterized in claim 1 wherein said pump has an inlet passage connected to said reservoir and is provided with first and second discharge passages connected to deliver water to said holder and to return water to said reservoir respectively, said first discharge passage having a relatively reduced fluid flow for delivering hot water at a relatively low pre-determined rate for brewing, and said second discharge passage having a relatively open fluid flow to said reservoir for circulating water through said pump for minimizing cavitation therein.

References Cited in the file of this patent

UNITED STATES PATENTS

| | | |
|---|---|---|
| 1,915,678 | LaBour | June 27, 1933 |
| 2,360,194 | Bright | Oct. 10, 1944 |
| 2,706,444 | Chaplik | Apr. 19, 1955 |
| 2,730,034 | Svendsgaard | Jan. 10, 1956 |
| 2,748,689 | Rotman | June 5, 1959 |

FOREIGN PATENTS

| | | |
|---|---|---|
| 96,293 | Switzerland | Oct. 2, 1922 |
| 1,226,353 | France | Feb. 22, 1960 |